US008591777B2

(12) United States Patent
DiGiovanni et al.

(10) Patent No.: US 8,591,777 B2
(45) Date of Patent: Nov. 26, 2013

(54) METHOD OF CONTROLLING LONGITUDINAL PROPERTIES OF OPTICAL FIBER

(75) Inventors: David J. DiGiovanni, Mountain Lakes, NJ (US); Jeffrey W. Nicholson, Morristown, NJ (US); Paul S. Westbrook, Bridgewater, NJ (US); Man F. Yan, Berkeley Heights, NJ (US)

(73) Assignee: OFS Fitel, LLC, Norcross, GA (US)

( * ) Notice: Subject to any disclaimer, the term of this patent is extended or adjusted under 35 U.S.C. 154(b) by 784 days.

(21) Appl. No.: 12/316,740

(22) Filed: Dec. 15, 2008

(65) Prior Publication Data

US 2010/0148383 A1   Jun. 17, 2010

(51) Int. Cl.
*B29D 11/00* (2006.01)

(52) U.S. Cl.
USPC .......... 264/2.7; 264/1.27; 264/1.36; 264/1.7; 65/407; 65/425

(58) Field of Classification Search
USPC ............. 264/1.27, 1.36, 1.7, 2.7; 65/407, 425
See application file for complete search history.

(56) References Cited

U.S. PATENT DOCUMENTS

| | | | |
|---|---|---|---|
| 4,498,917 A * | 2/1985 | Weinstein et al. | 65/382 |
| 4,932,990 A * | 6/1990 | Michie et al. | 65/420 |
| 5,235,659 A * | 8/1993 | Atkins et al. | 385/124 |
| 5,478,371 A * | 12/1995 | Lemaire et al. | 65/384 |
| 5,500,031 A * | 3/1996 | Atkins et al. | 65/386 |
| 5,559,907 A * | 9/1996 | Inniss et al. | 385/11 |
| 5,951,731 A * | 9/1999 | Tsunetomo et al. | 65/61 |
| 6,209,356 B1 | 4/2001 | Cocito et al. | |
| 6,272,886 B1 * | 8/2001 | Novack et al. | 65/387 |
| 6,539,154 B1 | 3/2003 | Berkey et al. | |
| 6,987,917 B2 * | 1/2006 | Hirano et al. | 385/124 |
| 7,057,735 B2 | 6/2006 | Jasapara | |
| 7,058,267 B2 * | 6/2006 | Neuhaus et al. | 385/48 |
| 2001/0003911 A1 | 6/2001 | Okuno et al. | |
| 2001/0038740 A1 | 11/2001 | Hasegawa et al. | |
| 2005/0150256 A1* | 7/2005 | Chuang et al. | 65/392 |
| 2006/0245705 A1* | 11/2006 | Hirano et al. | 385/123 |

* cited by examiner

*Primary Examiner* — Joseph S Del Sole
*Assistant Examiner* — David N Brown, II
(74) *Attorney, Agent, or Firm* — Wendy W. Kobe, Esq.

(57) ABSTRACT

A method of creating optical fiber to exhibit predetermined length-dependent characteristics (e.g., chromatic dispersion, polarization mode dispersion, cutoff wavelength, birefringence) includes the steps of: characterizing the fiber's selected characteristic(s) as a function of length; and performing a "treatment" which modifies the refractive index over the given length to adjust the defined parameter to fall within a defined tolerance window. These steps may be repeated one or more times until the measure of the parameter falls with the defined tolerance limits. The treatment process may include, for example, a low energy actinic radiation exposure, anneal, mechanical strain, DC voltage, plasma application, etc. Indeed, if the treatment process is repeated, a different technique may be used to adjust the refractive index ("different" processes include, for example, modifying the strength/time of a UV exposure, temperatures for annealing, etc.).

13 Claims, 4 Drawing Sheets

D: dispersion
L: length
V: velocity
I(t): intensity varies with time.

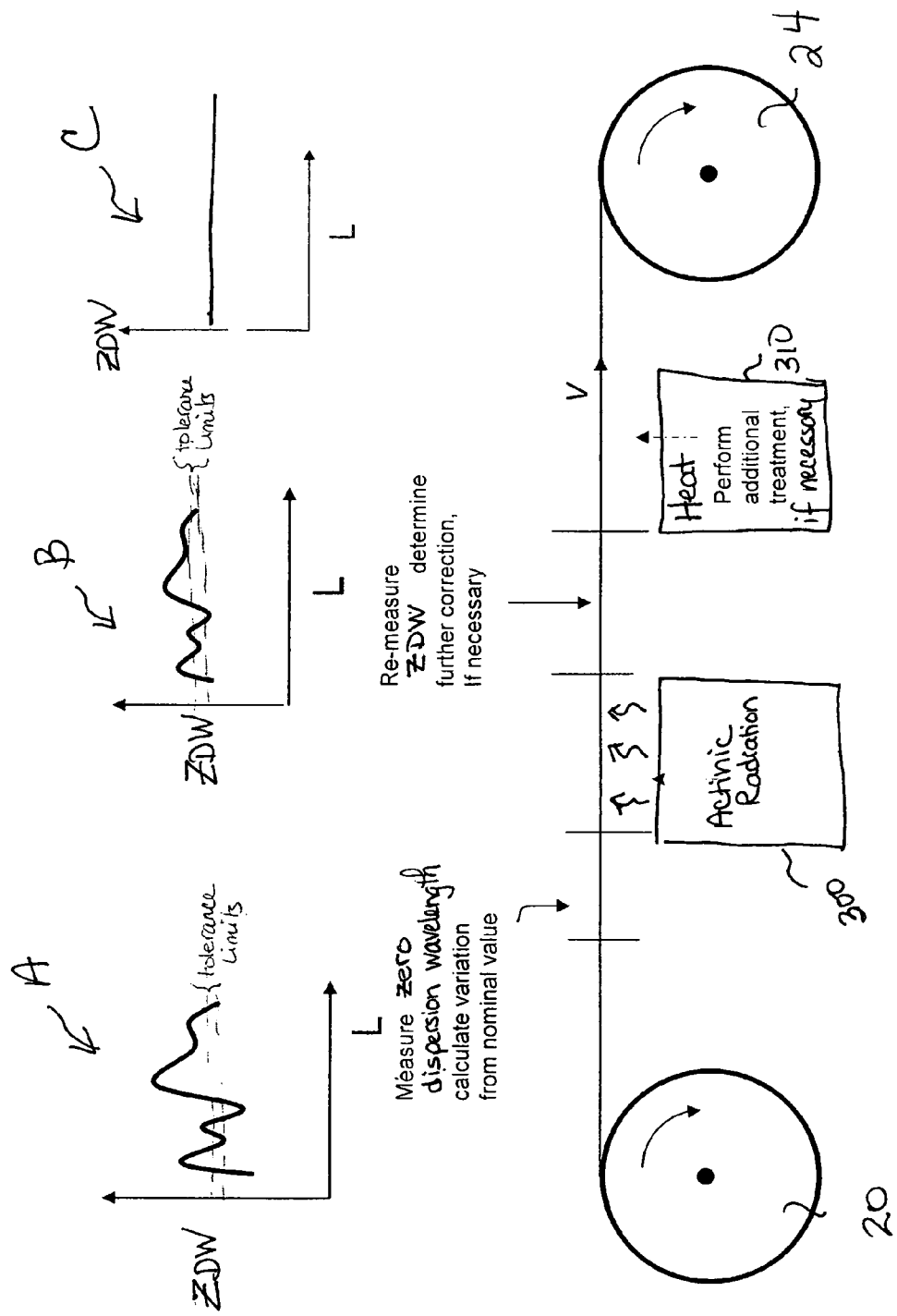

METHOD OF CONTROLLING LONGITUDINAL PROPERTIES OF OPTICAL FIBER

TECHNICAL FIELD

The present invention relates to a method of fabricating optical fiber and, more particularly, to a method of modifying an optical fiber's refractive index as a function of length to create predetermined length-dependent characteristics as required for different applications.

BACKGROUND OF THE INVENTION

Optical fiber continues to evolve as a transport mechanism in a variety of applications including, but not limited to, communication systems, industrial and environmental sensors, medical imaging and the like. More applications continue to be uncovered daily. When first used in telecommunication applications, the characteristics of a basic silica fiber (in terms of core/cladding dimensions, refractive index profile, etc.) were relatively simple to be controlled using processes such as modified chemical vapor deposition (MCVD) and vapor-assisted deposition (VAD) developed at Bell Laboratories in the 1970's and 80's (see, for example, U.S. Pat. Nos. 4,257,797; 4,707,174; and 4,932,990). The growth in variety of applications and types of fiber has resulted in the need to develop specialized fabrication processes. Besides conventional single mode fiber (SMF) and multimode fiber (MMF), fibers such as dispersion-shifted fiber (DSF), dispersion-compensating fiber (DCF), polarization-maintaining fiber (PMF), microstructured fiber, large-mode-area fiber (LMA fiber), higher-order-mode fiber (HOM fiber), doped fiber amplifiers and highly-nonlinear fiber (HNLF) have been developed to meet particular needs. Fibers in one or more of these types have also been formed to include multiple, separated core regions.

In each case, the different fiber types have developed a particular set of characteristics, in terms of the dimensions of the various core and cladding layers, materials and dopants used to form these layers and processes used to create the specialized layers. While various specialized processes have been developed to fabricate specialized preforms from which these fibers are drawn, the as-drawn fiber may exhibit length-dependent variations which are unacceptable. Length-dependent variations in nonlinear characteristics such as chromatic dispersion, polarization mode dispersion, birefringence, zero dispersion wavelength, cutoff wavelength (for both fundamental and higher-order modes), stimulated Brillouin scattering (SBS) characteristics and the like have limited the capabilities of these fibers. In some applications where only short lengths of fiber are used, the length-dependent variations are of little concern. However, in applications where relatively long lengths of fiber are required, any significant length-dependent variation in one or more of these characteristics may be problematic.

For example, HNLF is a dispersion-shifted fiber with a small effective area ($A_{eff}$) for nonlinear applications such as, for example, continuum generation and four-wave mixing (FWM). U.S. Pat. Nos. 6,775,447 and 7,171,089—assigned to the assignee of this application—describe the utilization of HNLF for these activities. As discussed in these and other prior art references, relatively short lengths of HNLF are used to perform continuum generation and FWM. However, when it is desired to use longer lengths of HNLF for other applications, the non-uniformity of the chromatic dispersion profile as a function of fiber length becomes problematic. At least one source of the variation in dispersion can be attributed to changes in the fiber diameter during fabrication (e.g., drawing from a fiber preform into the final fiber), where slight changes in diameter have been found to introduce significant changes in the dispersion.

A sensitivity analysis on the design of HNLF shows that if the zero-dispersion wavelength (ZDW) of the fiber is required to change no more than 0.1 nm over a 1 km length, the fiber diameter must not change by more than 0.002%. For a 125 µm fiber, this translates to a diameter variation of less than 2.8 nm over 1 km.

One prior art method for modifying the diameter of a drawn fiber is disclosed in U.S. Pat. No. 7,317,856 issued to M. Hirano et al. on Jan. 8, 2008. While not directed to the fabrication of HNLF or its peculiar requirements, the Hirano et al. method does provide an analysis of a fiber preform and thereafter modify its diameter to provide "desired" optical characteristics. In particular, the refractive index profile of the fiber preform is analyzed and demarcations made on the preform to indicate regions where the profile is not uniform. Thereafter, the preform outer surface is subjected to a grinding operation to re-create a uniform profile and the ground preform is drawn down into a fiber with an essentially uniform refractive index profile.

While this method is suitable for use in improving the uniformity of the refractive index profile of a standard profile, such a method is not considered useful in controlling various parameters in many of today's specialized fibers, where the draw process itself is known to introduce slight variations in fiber diameter sufficient to create undesired length-dependent variations.

Additionally, there are situations where it is desired to introduce a post-drawn modification to the fiber characteristics. For example, in a multi-core fiber it may be desired to adjust the coupling between the cores in a case-by-case (i.e., application-specific) basis, or adjust the inter-core coupling as a function of length. In some instances, a non-constant but controlled refractive index profile is desirable, such as providing an axial variation in index which anticipates the axially-varying optical field propagating through the fiber. Moreover, it would be desirable to modify certain characteristics of an optical fiber at the time of system installation or field deployment (for example) such that the optical fiber's characteristics are particularly tailored to the needs of the specific application and related conditions.

Thus, a need remains in the art for a method of providing modifications to an optical fiber's characteristics to particularly tailor the refractive index profile of an optical fiber for a specific fiber type and application.

SUMMARY OF THE INVENTION

The present invention addresses the needs in the prior art, providing a method of fabricating an optical fiber and, more particularly, to a method of modifying an optical fiber's refractive index as a function of length to create predetermined length-dependent characteristics as required for different applications.

In accordance with the present invention, the refractive index profile of a given length of optical fiber is first determined and then compared with the desired profile required for a specific application of that specific section of optical fiber. A selected treatment (for example, actinic radiation exposure, thermal annealing, DC voltage application, etc.) is then applied to the fiber to modify the refractive index profile until the fiber exhibits the desired characteristics for the specific application. The dosage and duration of each treatment is controlled to ensure that an over-correction is not created. In particular, one or more treatments may be applied to the fiber until the refractive index profile is suitable for the specific application.

It is an aspect of the present invention that a treatment is used to introduce length-dependent modifications in characteristics such as (but not limited to) chromatic dispersion, polarization mode dispersion, dispersion slope, zero dispersion wavelength, cutoff wavelengths for optical filters (both fundamental mode and higher-order mode fibers), birefringence, SBS characteristics, etc. Indeed, it is possible to introduce a length-dependent change in any linear or nonlinear characteristic of an optical fiber by applying the treatment process of the present invention.

The refractive index modification treatment may be implemented in a manner where the refractive index profile of a complete length of fiber is measured and stored as an "index map". Thereafter, the fiber is continuously passed through a treatment process, with the parameters of the treatment process adjusted under the control of the index map to create a final fiber with the desired length-dependent characteristics (referred to at times hereinafter as a "reel-to-reel" process). Alternatively, a "stop and correct" process may be employed where the refractive index of a given section of fiber is measured and a process used to adjust the index of the measured section; the "stop and correct" process is subsequently applied to each section of fiber in turn.

In accordance with one embodiment of the present invention, the refractive index modification is performed by exposing a section of optical fiber to a low dose of actinic radiation (on the order one joule/cm$^2$, as compared to the value of kJ/cm$^2$ used with creating grating elements along an optical fiber). The low dose of actinic radiation will modify the local refractive index value of some region of the fiber in which the optical field resides. This change in refractive index may be used to, for example, change the dispersion of the fiber, the location of the zero dispersion wavelength(s), dispersion slope, birefringence, degree of inter-core coupling, etc.

In further accordance with this embodiment of the present invention, dosages of UV radiation at wavelengths of 193 nm, 242 nm, 244 nm, 248 nm or 308 nm (or multiple dosages, as the case may be) may be employed. Glass optical fibers require a protective polymer coating to maintain strength against mechanical damage (such as abrasion). To simplify the inventive process of exposing the optical fiber to actinic radiation, a protective polymer coating which is at least partially transparent to the actinic radiation can be used. Alternatively, the coating may be removed immediately prior to the exposure and then reapplied. A high temperature treatment may be applied in this case to restore fiber strength, using a temperature at or near the glass melt temperature. Besides UV exposure, femtosecond IR systems or $CO_2$ laser systems may be used as sources for the actinic radiation treatment embodiment of the present invention (in general "actinic radiation" can be defined as radiation at any wavelength which causes photochemical changes or variations in glass density, strain or stress in the materials used in optical fiber fabrication). Other processes which may be used to modify the refractive index values include, but are not limited to, thermal annealing, application of mechanical strain, application of a DC voltage or plasma, and the like.

The dopants used to create various types of fibers/regions (e.g., Ge, P, F) may also be adjusted/modified to introduce another variable into the use of actinic radiation to impart desired length-dependent changes to an optical fiber's characteristics. For example, phosphorous may be used as a core dopant in addition to germanium to provide for two different components that may be adjusted to modify the dispersion as a function of fiber length. The core dopant distribution may also be varied in the radial direction so that the actinic radiation exposure produces an index change which varies as a function of the core radius and effectively alters the radial index profile of the fiber.

For stable soliton propagation, it is desirable to have the fiber dispersion decreasing along the propagation length. In a non-zero dispersion fiber exhibiting a core index of about 0.00657 $\Delta$n (yielding a dispersion of 6.34 ps/nm-km at a wavelength of 1.55 µm), the refractive index modification process of the present invention can be used to change the core index along the fiber length to obtain a dispersion-decreasing fiber. For example, by increasing the core index to 0.00875 $\Delta$n, the dispersion will be increased to 11.36 ps/nm-km. On the other hand, the dispersion can be reduced to 1.43 ps/nm-km by decreasing the core index to 0.000512 $\Delta$n. This technique can then be used to taper the fiber dispersion from 11.4 ps/nm-km to 1.5 ps/nm-km over the axial length of the fiber.

For optical filtering applications, it is often desirable to maintain a constant cutoff wavelength for the fundamental ($LP_{01}$) mode (or higher-order modes in special applications). However, a small decrease in the core diameter (e.g., from 2.59 µm to 2.46 µm) shifts the $LP_{01}$ mode cutoff wavelength from 1.606 µm to 1.524 µm—a highly undesirable result for filter applications. Therefore, the technique of the present invention may be used to compensate for this undesirable decrease in core diameter by increasing the core index from 0.025 $\Delta$n to 0.027 $\Delta$n such that the $LP_{01}$ cutoff wavelength is maintained at the desired 1.606 µm value. It is further possible that the attenuation at different wavelengths may be monitoring during the index modification process to provide useful feedback on the index change required to achieve the desired tuning of the cutoff wavelength.

Various and other modifications of the method of the present invention will become apparent during the course of the following discussion and by reference to the accompanying drawings.

BRIEF DESCRIPTION OF THE DRAWINGS

Referring now to the drawings,

FIG. 4 is a variation of the exemplary apparatus of FIG. 2, where multiple modification steps are performed.

DETAILED DESCRIPTION

Previously, techniques such as UV exposure have been used to modify the refractive index of short sections of optical fiber. The ability to "write" gratings into optical fibers with UV radiation has been standard practice (see, for example, U.S. Pat. No. 5,773,486 for a complete description of one exemplary UV-writing process). Recently, UV radiation has been utilized with highly-nonlinear fiber (HNLF) to create four-wave mixing (FWM) or extend continuum generation to provide a supercontinuum source. In the latter case, a UV exposure on the order of 2.5 kJ/cm$^2$ was applied to a deuterium-loaded HNLF to create an index change of 0.005, causing a shift in the zero dispersion wavelength (ZDW) of almost 100 nm.

In contrast, the length-dependent modifications in optical characteristics performed by the present invention require UV radiation levels which are orders of magnitude less than those required for these prior art applications. Profiles of grating growth in HNLF have shown that to achieve a $\Delta n$ of $5 \times 10^{-4}$ to $5 \times 10^{-6}$ (typical for the modifications associated with the present invention) requires about $1/40^{th}$ to $1/4000^{th}$ of the UV exposure levels associated with the above-described prior art applications (e.g., gratings, continuum sources). Due to normal variations during fiber draw of $\pm 0.2$ μm fiber diameter over a 1 km length of HNLF (for example), the ZDW of HNLF will vary by roughly $\pm 7.1$ nm, requiring a correction in the refractive index $\Delta n$ on the order of $\pm 0.00034$.

Consequently, the necessary change in $\Delta n$ for the length-dependent method of this invention can be achieved after the application of UV-transparent coatings to an optical fiber. Further, this level of change can be achieved without needing to add other dopants (such as, for example, deuterium) to the fiber core region. In the case where it is desired to control the ZDW to exhibit variations no greater than picometer (pm) level over long lengths of fiber (for example, a ZDW of 1350.001 nm vs. 1350.002 nm), using a dosage on the order of one $J/cm^2$ is sufficient (instead of prior art $kJ/cm^2$ dosages).

Figure 1:
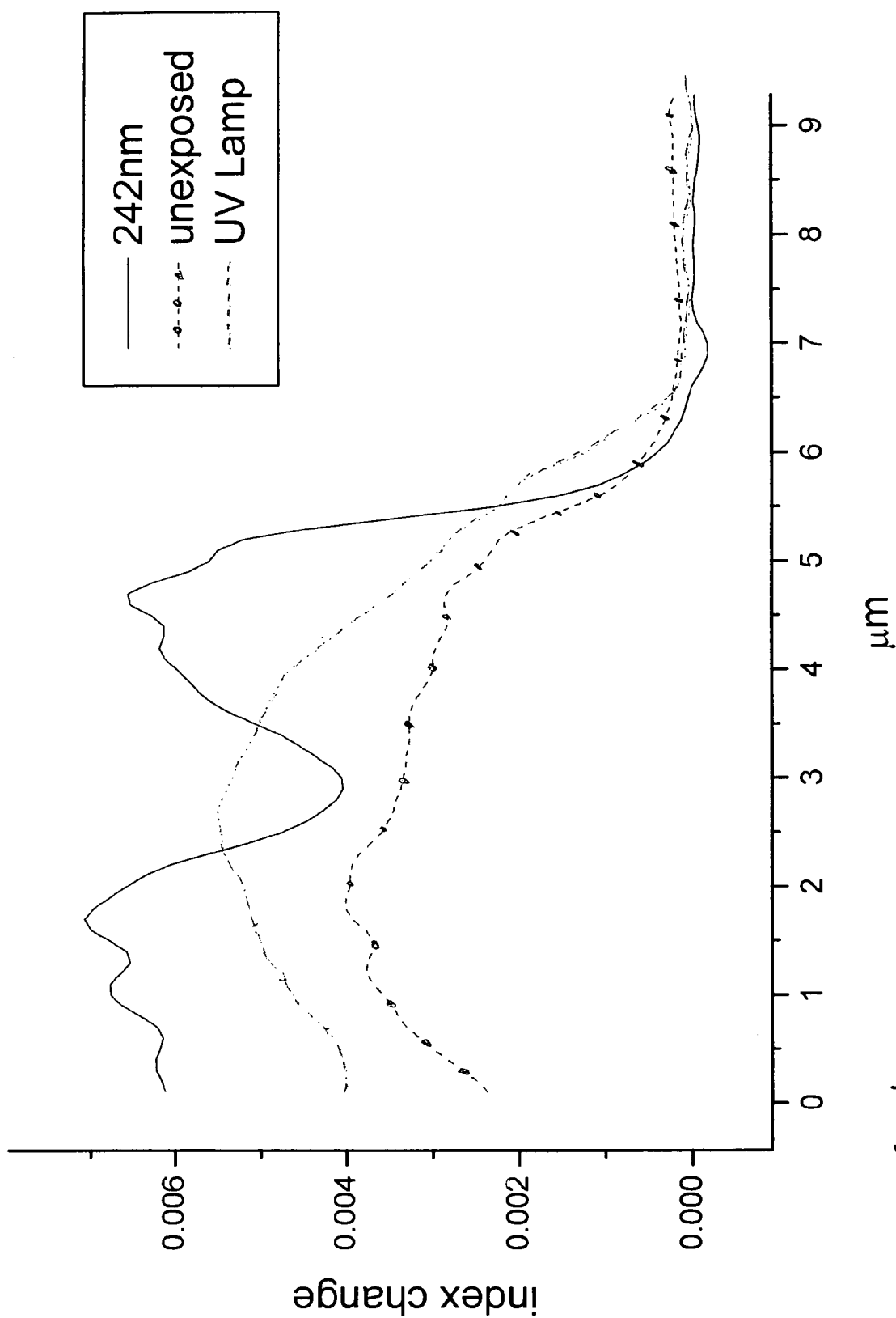
FIG. 1 is a plot of exemplary changes in an optical fiber's refractive index profile which can be achieved using various treatment processes of the present invention.

FIG. 1 contains various plots of the refractive index profile of an exemplary optical fiber including two core dopant materials: germanium (Ge) and phosphorous (P). In particular, the P doping is disposed within a ring structure formed within the core. The "unexposed" plot defines the refractive index profile immediately after the fiber has been drawn down from the initial preform to the final fiber structure. The application of UV lamp illumination as an "index correction" process in accordance with the present invention is shown to provide a refractive index change $\Delta n$ on the order of approximately 0.0015-0.0020 within the inner core region (the Ge-doped region) of the fiber and will also increase the index of the surrounding P-doped ring. As also shown in FIG. 1, the use of a pulsed UV exposure (e.g., approximately 20 ns pulses) at a wavelength of 242 nm creates a more significant index change (on the order of 0.004 at the center of the core region). In contrast to the lamp illumination process, radiation with 242 nm light only effects the Ge dopant, thus only the index of the Ge-doped inner core region will increase; the refractive index value of the P-doped inner ring will remain constant. As described above, the particular index modification process to be used, as well as the parameters of the selected process, are chosen to provide the particular degree of index correction that is required.

Figure 2:
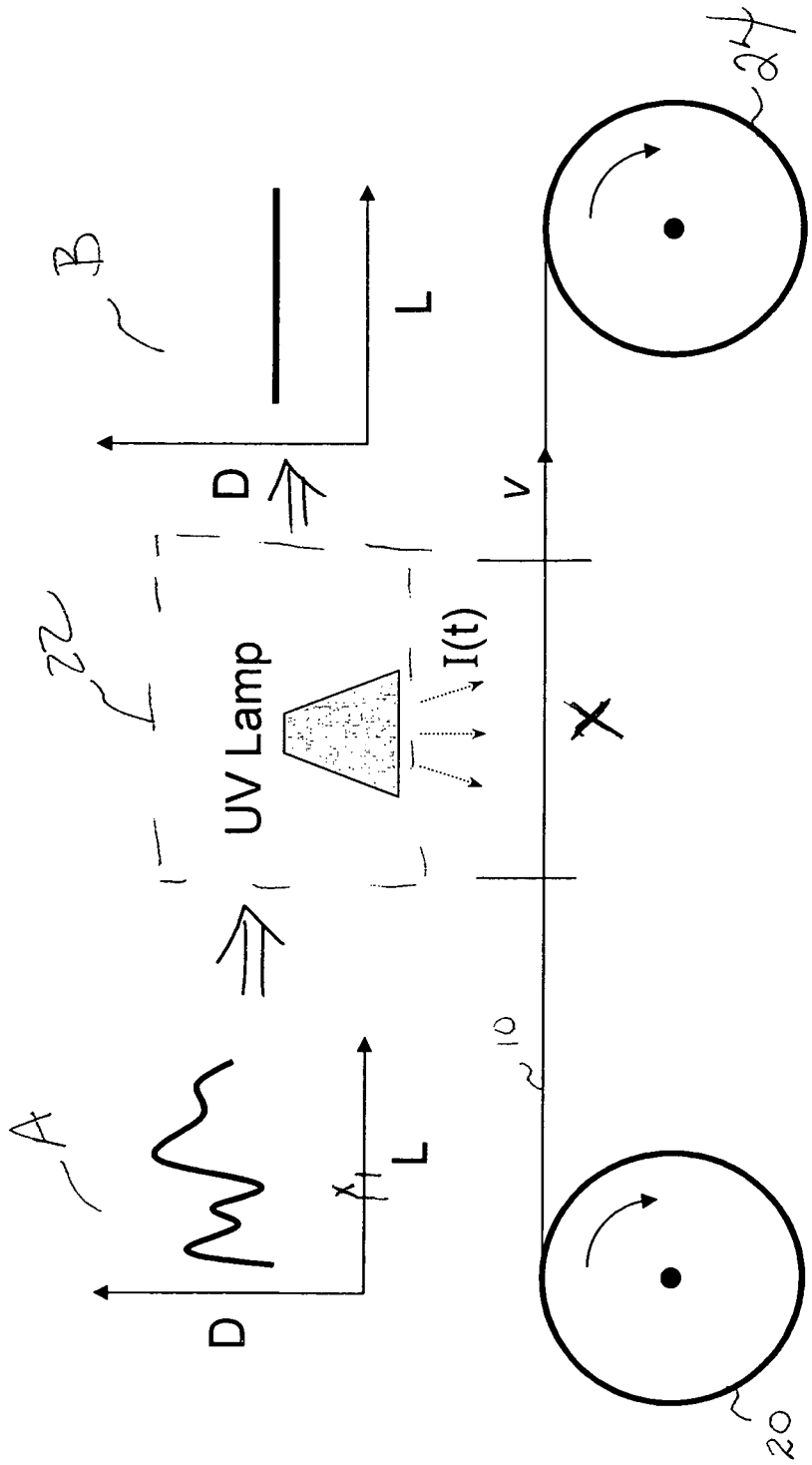
FIG. 2 illustrates an exemplary apparatus for performing the refractive index modification process of the present invention.

FIG. 2 is a simplified diagram of an exemplary arrangement for providing length-dependent refractive index modifications to an optical fiber in accordance with the present invention. It is presumed, in this case, that it is desired to maintain a constant value of chromatic dispersion (D) along a long length of optical fiber. The dispersion of the drawn fiber as a function of length is first measured and stored as a "dispersion map" for later use by the process. The characterization itself may take the form of performing Rayleigh backscattering measurements from the four-wave mixing of signals launched into the fiber, yielding a direct measurement of the dispersion as a function of length. Alternatively, the diameter of the fiber may be measured, and the associated dispersion calculated from the diameter value. Other arrangements for creating a dispersion map may be used in accordance with the present invention.

The apparatus as shown in FIG. 2 then uses this dispersion map information as an input and determines the amount of correction required (if any) to bring the refractive index profile of sequential sections of fiber within a predetermined tolerance range associated with a constant dispersion. If a correction is required, the degree of correction will dictate the parameters of the treatment process. For example, if a UV exposure process is used, the wavelength, duration and energy level of the exposure will be adjusted to provide the proper amount of correction. If the application of a DC voltage is used, the voltage level and duration of the application will be controlled accordingly. Similar parameters are adjusted for a thermal-based correction process, mechanical (strain) process, etc.

Referring to FIG. 2, an as-fabricated optical fiber 10 is shown as exhibiting a dispersion that varies as function of length (inset A in FIG. 2 is a plot of an exemplary variation, in arbitrary units). In order to perform the refractive index modifying process of the present invention, fiber 10 is un-spooled from a first reel 20 at a given velocity (v) so as to pass through a treatment apparatus 22 which functions to modify the refractive index of the fiber. In the exemplary arrangement of FIG. 2, segments of fiber 10 of length X are sequentially subjected to treatment within apparatus 22. Based on the previously-characterized dispersion profile of each section X, the proper level of actinic radiation exposure (for example) from treatment apparatus 22 is used to modify the refractive index values and correct the associated chromatic dispersion to remove any length-dependent variations, herein referred to as a "stop and correct" process. Thus, as fiber 10 exits apparatus 22, its dispersion profile has been corrected to be essentially uniform as a function of length (inset B of FIG. 2 is a plot of post-treatment fiber dispersion as a function of length). In the arrangement as shown in FIG. 2, the dispersion-corrected fiber is thereafter taken up on a second reel 24.

The following figures illustrate a variety of different arrangements which may be used to provide refractive index modifications to long lengths of optical fiber in accordance with the present invention and as shown in simplified form in FIG. 2. While various methods are shown and described, it is to be understood that this presentation is not considered to be exhaustive; there are many other techniques and combination of techniques that may be employed to provide the desired index modification in accordance with the present invention. Moreover, it is a feature of the invention that the treatment may be applied at any time during the life of the fiber. For example, a treatment applied immediately after drawing the fiber from the preform may be used to "correct" unwanted as-fabricated variations in selected parameters. Alternatively, a treatment may be applied to a fiber upon installation in a specific system in order to modify certain characteristics (e.g., increase SBS threshold, shift ZDW values) with respect to system requirements. Additionally, "field" treatments may be used after fiber installation to adjust characteristics which may have changed due to environmental or aging effects.

In some instances, a fabricated fiber will include an outer protective coating. When using the refractive index modifying treatment of the present invention subsequent to the application of this coating, it may be necessary to remove selected portions of the coating (stripping) prior to performing the treatment. This is particularly relevant in instances where a thermal annealing treatment process is used and the application of a high temperature may affect the qualities of the coating (a thermal anneal process may also be used to increase the mechanical strength of the stripped fiber). At the completion of the treatment, the coating may be re-applied. If using only actinic radiation exposure processes, there are outer coating materials which are at least partially transparent to the wavelengths used for the treatment process and thus do not need to be removed.

Figure 3:
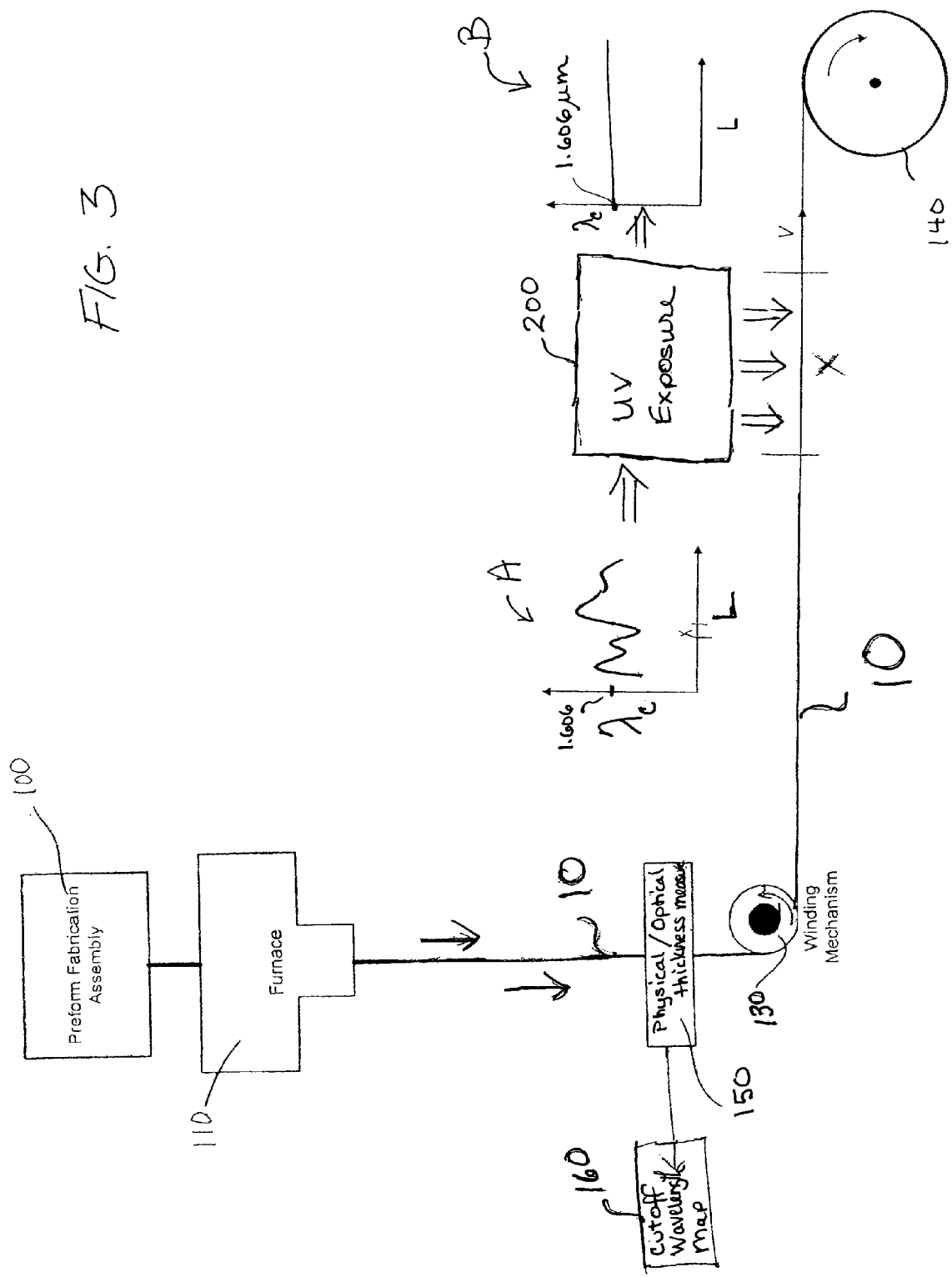
FIG. 3 is a diagram of a system for creating length-dependent modifications in an optical fiber's refractive index profile immediately after the fiber is drawn from a preform.

FIG. 3 illustrates an exemplary treatment apparatus used in accordance with the present invention immediately after the fiber has been drawn down from a preform. In this case, a standard fiber preform is created/fabricated in a preform fabrication assembly 100. Thereafter, the preform is introduced into a furnace 110, which is maintained at a temperature sufficient to soften the preform (e.g., ~2000° C.). Fiber from the heated preform then exits furnace 110 and is drawn downward, under the control of a winding mechanism 130 which provides the desired tension required to draw the preform down to the predetermined final fiber diameter (e.g., 125 µm). The drawn fiber is then spooled onto a winding drum 140 to complete the fabrication process.

In this particular embodiment of the present invention, it is desired to create optical fiber useful for filtering, where the fiber maintains a constant cutoff wavelength along its length. One exemplary technique for measuring the cutoff wavelength is disclosed in U.S. Pat. No. 7,057,735 issued to J. Jasapara on Jun. 6, 2006 and assigned to the assignee of this application. The Jasapara method measures both the absolute physical thickness and optical thickness of a fiber using a reflective interferometric process. Other processes for obtaining a measure of the cutoff wavelength as a function of length may be used. In the arrangement as shown in FIG. 3, a characterization apparatus 150 is disposed immediately prior to winding mechanism 130 and is used to determine the cutoff wavelength of the fiber as it passes therethrough. The determined cutoff wavelength values are then stored in a cutoff wavelength map 160, for later use in the modification process of the present invention. It is to be presumed, for this particular embodiment, that the cutoff wavelength should remain constant as a function of length (the desired result shown as a dotted line in the plot of measured PMD).

As shown in FIG. 3, a treatment module 200 is disposed to interact with a predetermined section of fiber 10 of length X after is passes through winding mechanism 130. Treatment module 200 uses the information stored in cutoff wavelength map 160 as an input to determine the degree of treatment required to modify the refractive index profile to compensate for core diameter variations which create cutoff wavelength variations along length X of fiber 10. The as-fabricated cutoff wavelength $\lambda_c$, as a function of length, is illustrated to the left of treatment module 200 (inset A), with the corrected cutoff wavelength measured values as function of length shown to the right thereof in inset B.

Treatment module 200 may comprise a variety of different components which are capable of making the necessary minor modifications in the refractive index profile of the optical fiber required to control the cutoff wavelength value. In the particular embodiment shown in FIG. 3, treatment module 200 comprises a UV exposure system which is capable of modifying the refractive index value of the core and correct the cutoff wavelength value.

As mentioned above, more than one treatment may be used to adjust the refractive index profile of fiber 10. FIG. 4 illustrates a simplified diagram illustrating the use of two, sequential processes to fine-tune the changes in the refractive index profile of a section of optical fiber in accordance with the present invention. In this case, it is desired to control the zero dispersion wavelength (ZDW) to remain constant along the entire length of optical fiber. As with the above-described processes, the ZDW of the fiber as a function of length is first measured and (perhaps) stored in a ZDW map memory (inset A). Referring to FIG. 4, an initial process 300 is used to modify the ZDW as a function of fiber length, based on the values stored in the associated ZDW map and an understanding of the changes in refractive index values required to modify the ZDW. The ZDW is then re-measured and, if found to vary beyond predetermined tolerance values, a second refractive index modification process 310 is used to further alter the refractive index values. A second measurement confirms that the ZDW is now within the predetermined tolerance limits.

In general, the refractive index modification process of the present invention may be applied any number of times until the desired results are achieved. Moreover, various types of treatments may be used. In the exemplary embodiment of FIG. 1, initial process 300 may take the form of a UV exposure, and second process 310 may be a thermal annealing process. The temperature-induced changes in the dispersion of an optical fiber will remain fixed as long as the fiber is thereafter used at temperatures less than the annealing temperature (e.g., 120° C.). Typical annealing temperatures will provide a 5-10% change in the UV-induced index value. For high temperature anneals, it is possible to first strip the outer coating from the fiber (at least from the section being subjected to the anneal), and then re-apply the coating at the completion of the anneal process.

In order to adjust the amount of index change as a function of optical fiber length, the anneal temperature must be varied over a given range so that different levels of anneal will provide different fiber refractive indices. Alternatively, UV exposure may be performed at two different wavelengths to create different levels of change in refractive index.

As mentioned above, the fiber itself may be modified to include different/additional dopants (e.g., Ge, P or F) in the core; each dopant exhibiting a different reaction to the UV exposure. The diameter of the fiber itself may be modified (i.e., tapered) by using a process similar to the original draw technique to change the dispersion value as a function of length. Other types of process which may be used to modify the refractive index profile include the application of strain, application of DC voltage, application of a plasma, or any combination thereof.

Further, it is to be understood that the refractive index modification process of the present invention may be applied to an optical fiber at any suitable point in time. While depicted above as used immediately after the drawing of a fiber from a preform, the process may be applied at the time of deployment, post-deployment to change/correct parameters as the fiber ages or the application changes, etc.

While the present invention has been described with reference to the preferred embodiments thereof, the invention is not to be limited to the details given herein, but may be modified within the scope of the invention hereinafter claimed.

What is claimed is:

1. A method of controlling optical characteristics along a length of optical fiber, the method comprising the steps of:
   a) selecting an optical characteristic to be controlled as a function of length along an optical fiber;
   b) defining a desired length-dependent value of the selected optical characteristic;
   c) measuring the value of the selected optical characteristic of the optical fiber as a function of length;
   d) comparing the value determined in step c) to the desired value defined in step b); and
   e) performing a refractive index-modifying treatment on the optical fiber, as a function of length, until the measured value of the selected optical characteristic is within a predetermined tolerance limit of the desired length-dependent value of the selected optical characteristic defined in step b).

2. The method as defined in claim 1 wherein the selected optical characteristic defined in step a) is selected from the group consisting of: chromatic dispersion, dispersion slope, zero dispersion wavelength, cutoff wavelength for fundamental and higher-order modes, polarization mode dispersion, birefringence, and SBS characteristics.

3. The method as defined in claim 1 wherein the index-modifying treatment of step c) includes at least one process selected from the group consisting of: actinic radiation exposure, thermal annealing, DC voltage application, mechanical strain application, and plasma application.

4. The method as defined in claim 3 wherein the actinic radiation exposure process is selected from the group consisting of: UV radiation at one or more selected wavelengths, lamp radiation, femtosecond IR radiation and $CO_2$ laser radiation.

5. The method as defined in claim 4 wherein multiple actinic radiation exposure processes are used to modify the refractive index profile.

6. The method as defined in claim 4 wherein UV radiation at one or more selected wavelengths selected from the group of: 193 nm, 242 nm, 244 nm, 248 nm, and 308 nm.

7. The method as defined in claim 1 wherein in performing step c), the step further includes creating a map of the measured value of the selected optical characteristic for a complete length L of said optical fiber prior to performing steps d) and e).

8. The method as defined in claim 1 wherein in performing step e), a "stop and correct" process is used for sequential predetermined lengths X of the optical fiber.

9. The method as defined in claim 1, wherein the fabricated optical fiber is selected from the group consisting of: single mode fiber, multimode fiber, polarization-maintaining fiber, dispersion-shifted fiber, dispersion-compensated fiber, large mode area fiber, higher-order mode fiber, multiple-core fiber, microstructured fiber and highly-nonlinear fiber.

10. The method as defined in claim 1, wherein the optical fiber comprises one or more dopants selected from the group consisting of: Ge, P and F.

11. The method as defined in claim 1 wherein prior to performing step e), the process further comprises the steps of:
  i) stripping an outer coating from the optical fiber prior to performing the refractive index-modifying treatment of step e); and
  ii) re-applying an outer coating on the optical fiber subsequent to performing the refractive index-modifying treatment.

12. The method as defined in claim 11 wherein prior to performing step ii), the method includes the step of increasing the mechanical strength of the stripped optical fiber by a thermal annealing process.

13. The method as defined in claim 3 wherein the optical fiber comprises an outer coating that is at least partially transparent to radiation wavelengths associated with the actinic radiation process of the refractive index-modifying treatment.

* * * * *